(12) United States Patent
Arai et al.

(10) Patent No.: US 8,025,087 B2
(45) Date of Patent: Sep. 27, 2011

(54) ULTRASONIC VIBRATION WELDER

(75) Inventors: Masayoshi Arai, Atsugi (JP); Shigetomi Morita, Atsugi (JP)

(73) Assignee: Branson Ultrasonics Corporation, Danbury, CT (US)

(*) Notice: Subject to any disclaimer, the term of this patent is extended or adjusted under 35 U.S.C. 154(b) by 62 days.

(21) Appl. No.: 12/670,321

(22) PCT Filed: Jul. 23, 2008

(86) PCT No.: PCT/JP2008/063153
§ 371 (c)(1),
(2), (4) Date: Jan. 22, 2010

(87) PCT Pub. No.: WO2009/014130
PCT Pub. Date: Jan. 29, 2009

(65) Prior Publication Data
US 2010/0206487 A1    Aug. 19, 2010

(30) Foreign Application Priority Data
Jul. 24, 2007    (JP) ................. 2007-192040

(51) Int. Cl.
*B32B 37/00* (2006.01)
(52) U.S. Cl. .................. 156/580.2; 156/580.1
(58) Field of Classification Search .......... 156/73.1, 156/580.1, 580.2; 228/1.1, 110.1; 425/174.2; 264/442, 443, 444, 445; 310/321, 323.01, 310/323.18
See application file for complete search history.

(56) References Cited

U.S. PATENT DOCUMENTS

| 6,995,498 | B2* | 2/2006 | Wallaschek et al. ...... 310/323.18 |
| 7,344,620 | B2* | 3/2008 | Jung .......................... 156/580.2 |
| 7,718,022 | B2* | 5/2010 | Gerdes et al. ............... 156/73.1 |

FOREIGN PATENT DOCUMENTS

| EP | 64737 A2 | 11/1982 |
| JP | 37-04864 Y1 | 3/1962 |
| JP | 57-199586 A | 12/1982 |
| JP | 60-206471 A | 10/1985 |
| JP | 05-16277 U | 3/1993 |
| JP | 10-193138 A | 7/1998 |
| JP | 11-265914 A | 9/1999 |
| JP | 2005-28382 A | 2/2005 |
| JP | 2006-212619 A | 8/2006 |

* cited by examiner

*Primary Examiner* — James Sells
(74) *Attorney, Agent, or Firm* — Harness, Dickey & Pierce, P.L.C.

(57) ABSTRACT

The present invention solves the problem that a connecting portion between a horn and a vibration transmission rod has a tendency to get damaged and the problem associated with the structure in which a chip is attached to an end of the vibration transmission rod, which occur with the known ultrasonic vibration welder. A vibration transmission rod has an end surface serving as a vibration-and-pressure application surface, and a polygonal cross section. The vibration transmission rod is disposed at an end of a horn in such a manner that they vibrate together. The vibration transmission rod and a mass are formed separately. The mass applies pressure to a projection formed at a nodal point of the vibration transmission rod.

16 Claims, 8 Drawing Sheets

ULTRASONIC VIBRATION WELDER

BACKGROUND OF THE INVENTION

1. Field of the Invention

The present invention relates to ultrasonic vibration welders.

2. Description of the Related Art

Figure 10:
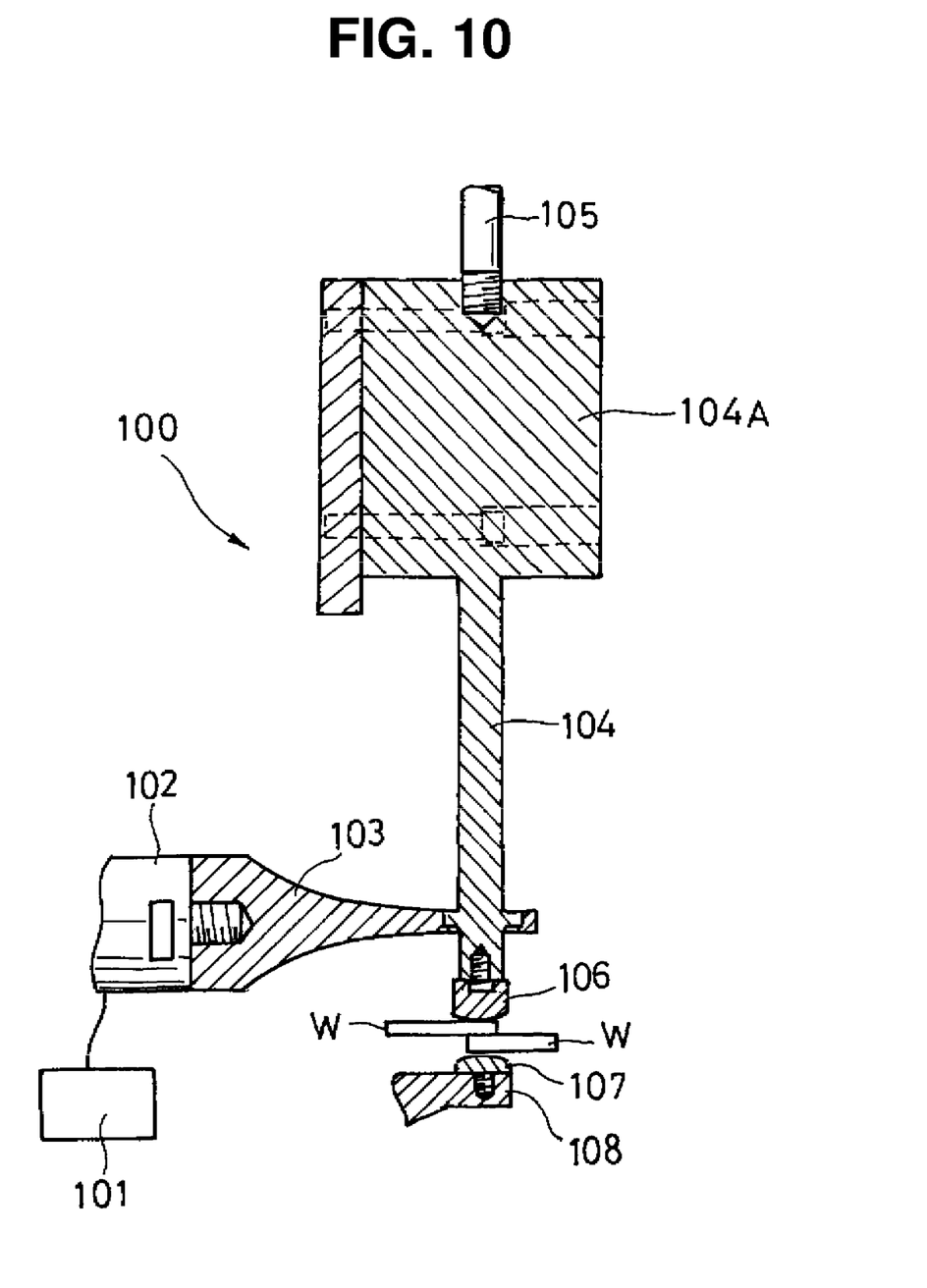
FIG. 10 shows a known ultrasonic vibration welder.

Various ultrasonic vibration welders for welding stacked ultrasonic-weldable parts, such as metal parts or plastic parts, by applying ultrasonic vibration and welding pressure are in practical use. Japanese Patent No. 2756433 discloses one of such ultrasonic vibration welders. FIG. 10 shows a relevant part of the ultrasonic vibration welder.

Referring to FIG. 10, an ultrasonic vibration welder 100 includes a generator 101 that generates an electrical frequency, an oscillator 102 that converts the electrical frequency generated by the generator 101 into mechanical vibration, a horn 103 that amplifies the vibration, the horn 103 being fixed to the oscillator 102 at one end and thinned at the other end, a vibration transmission rod 104 joined to the thinned end of the horn 103 in such a manner that it extends perpendicularly to the axis of the horn 103, a mass 104A serving as a resonator for applying pressure, and a pressure applicator 105 connected to the mass 104A. The horn 103 and the vibration transmission rod 104 are joined together by welding or brazing. The ultrasonic vibration welder 100 further includes a chip 106 attached to an end of the vibration transmission rod 104, an anvil 107 arranged at a position facing the chip 106, and an anvil base 108 that supports the anvil 107. Parts to be welded together are denoted by W and W.

In the ultrasonic vibration welder 100, the horn 103 causes the vibration transmission rod 104 to perform flexural vibration, while the pressure applicator 105 applies welding pressure to the vibration transmission rod 104, thereby causing friction between the parts W and W. The friction generates frictional heat, which diffuses or melt-bonds the parts W and W at portions subjected to friction. Thus, the parts W and W are welded together.

The vibration transmission rod 104 of the ultrasonic vibration welder 100 has a circular cross section. This means that the vibration transmission rod 104 resonates at a single frequency when flexural vibration is applied to the central axis thereof in any direction. There is no guarantee that the vibration transmission rod 104 always vibrates in the axial direction of the horn 103, which is an ideal vibration direction, during welding. Depending on the state of the load applied to a connecting portion between the vibration transmission rod 104 and the horn 103, the vibration transmission rod 104 can vibrate in a direction oblique to the axis of the horn 103, which is not an ideal vibration direction. However, the ultrasonic vibration welder 100 has no structure for solving this problem. Accordingly, there is a problem in that the connecting portion between the vibration transmission rod 104 and the horn 103 connected to the oscillator 102 has a tendency to get damaged.

Ultrasonic vibration generated by the oscillator 102 and the horn 103 is transmitted to the chip 106 through the vibration transmission rod 104. At the same time, welding pressure is applied to the parts W and W through the pressure applicator 105, the vibration transmission rod 104, and the chip 106. This structure has the problems described below.

The chip 106, which is brought into contact with the parts W and W during welding, is attached to an end of the vibration transmission rod 104. The problems lie in the structure in which the separately formed chip 106 and vibration transmission rod 104 are connected together. Examples of methods for attaching the chip 106 to an end of the vibration transmission rod 104 include a screw-in method as shown in FIG. 10 and a taper shank method (not shown).

In the case of an ultrasonic vibration welder that employs a screw-in method, a copper washer (not shown) is disposed between surfaces to be joined by a screw. However, the copper washer is degraded by heat and ultrasonic vibration transmission stress, and therefore the ultrasonic vibration welder cannot endure long-term use (after it is used about 5000 to 10000 times). In addition, if chips are screwed into ends of vibration transmission rods with a predetermined fastening force, the orientation of chip patterns with respect to the vibration direction varies. Accordingly, an ultrasonic vibration welder that employs a screw-in method cannot be used to weld parts that require the chip pattern and the ultrasonic vibration direction to be properly set.

In the case of an ultrasonic vibration welder that employs a taper shank method, it is possible to make chip patterns be oriented in the same direction with respect to the vibration direction. However, because chips are press-fitted to vibration transmission rods, the chips tend to drop or the fitting therebetween tends to become loose if the welding pressure during vibration is low. Thus, when tuning vibration, parts to be welded need to be disposed between the chip and the anvil while sufficient welding pressure with which normal vibration can be obtained is applied thereto. Further, in the case of welding products that require application of ultrasonic vibration under low pressure, such as small parts or thin parts, it is impossible to apply normal ultrasonic vibration because the welding pressure cannot be reduced during welding. Accordingly, it is impossible to weld such products. In addition, the vibration transmission rod is not durable. Because both the ultrasonic vibration and the welding pressure are transmitted to the chip through the vibration transmission rod, when welding is performed under high pressure, a shank portion of the vibration transmission rod is deformed and expanded.

In the known ultrasonic vibration welder 100, the mass 104A is formed integrally with the vibration transmission rod 104 at the end opposite the end to which the chip 106 is attached. Thus, when the vibration transmission rod 104 needs to be replaced for the reasons described above, the mass 104A also needs to be replaced. This is not cost effective.

SUMMARY OF THE INVENTION

The present invention has been made in view of the above, and it is an object of the present invention to provide an ultrasonic vibration welder that includes a vibration transmission rod having an end, the surface of which serves as a vibration-and-pressure application surface. The vibration transmission rod has a polygonal cross section, and is provided at an end of the horn in such a manner that they vibrate together. The vibration transmission rod and a mass are formed separately. The mass in contact with the vibration transmission rod presses a nodal point of the vibration transmission rod.

The present invention provides an ultrasonic vibration welder including a horn; a vibration transmission rod having an end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn, the vibration transmission rod having a projection that extends perpendicularly to an axis of the vibration transmission rod at a nodal point thereof, the vibration transmission rod having a resonant frequency in an axial direction of the horn and a resonant frequency in a direction intersecting the axis of the horn, the resonant frequencies being different from each other by at least 500 Hz; and a mass formed separately from the vibration transmission rod, the mass having a recess in an end surface thereof for receiving the other end of the vibration transmission rod, the end surface of the mass being configured to contact the projection of the vibration transmission rod while the recess receives the end of the vibration transmission rod, the mass pressing the nodal point of the vibration transmission rod.

The present invention further provides an ultrasonic vibration welder including a horn; a vibration transmission rod having an end, a surface of which serves as a vibration-and-pressure application surface, the vibration transmission rod having a polygonal cross section, the vibration transmission rod disposed at an end of the horn in such a manner that the vibration transmission rod extends perpendicularly to an axis of the horn, the vibration transmission rod having a notch that extends perpendicularly to an axis of the vibration transmission rod at a nodal point thereof and a component formed separately from the vibration transmission rod, the component being fitted into the notch; and a mass formed separately from the vibration transmission rod, the mass having a recess in an end surface thereof for receiving the other end of the vibration transmission rod, the end surface of the mass being configured to contact the component fitted into the notch in the vibration transmission rod while the recess receives the other end of the vibration transmission rod, the mass pressing the nodal point of the vibration transmission rod.

The present invention further provides an ultrasonic vibration welder including a horn; a vibration transmission rod having an end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn, the vibration transmission rod having a notch that extends perpendicularly to an axis of the vibration transmission rod at a nodal point thereof; and a mass formed separately from the vibration transmission rod, the mass having a recess in an end surface thereof for receiving the other end of the vibration transmission rod and having an inwardly extending projection at the end thereof, the inwardly extending projection being fitted into the notch in the vibration transmission rod and contacting an inner surface of the notch while the recess receives the other end of the vibration transmission rod, the mass pressing the nodal point of the vibration transmission rod.

The present invention further provides an ultrasonic vibration welder including a horn; a vibration transmission rod having an end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn; and a mass formed separately from the vibration transmission rod, the mass in contact with the vibration transmission rod pressing a nodal point of the vibration transmission rod, a resonant frequency of the mass in an axial direction thereof being set within ±25% of a resonant frequency of the vibration transmission rod.

The present invention has the above-described structure. The vibration transmission rod has a polygonal cross section. An end surface of the vibration transmission rod serves as a vibration-and-pressure application surface. Thus, the vibration transmission rod vibrates only in the axial direction of the horn during welding, thereby completely solving the problem that the connecting portion between the horn and the vibration transmission rod has a tendency to get damaged.

Further, the vibration transmission rod has a polygonal cross section, and has a resonant frequency in the axial direction of the horn and a resonant frequency in a direction intersecting the axis of the horn, the resonant frequencies being different from each other by at least 500 Hz. Thus, the vibration transmission rod vibrates only in the axial direction of the horn during welding, thereby completely solving the problem that the connecting portion between the horn and the vibration transmission rod has a tendency to get damaged.

In addition, unlike the known ultrasonic vibration welder, the vibration transmission rod uses not a chip attached to an end thereof but one of the end surfaces thereof as the vibration-and-pressure application surface. Accordingly, the problems associated with the structure in which a chip is attached to an end of the vibration transmission rod, which is employed in the known ultrasonic vibration welder, are completely solved. Further, both the end surfaces can be used as the vibration-and-pressure application surface by turning the vibration transmission rod upside down.

Further, the vibration transmission rod and the mass are formed separately. This solves the problems associated with the structure in which the vibration transmission rod and the mass are formed integrally, which is employed in the known ultrasonic vibration welder. Further, because the mass in contact with the vibration transmission rod presses the nodal point of the vibration transmission rod, pressure can be applied without affecting the vibration of the vibration transmission rod. Further, this configuration minimizes generation of frictional heat due to friction between the mass and the projection of the vibration transmission rod during application of pressure.

DESCRIPTION OF THE PREFERRED EMBODIMENTS

Preferred embodiments of the present invention are as follows:

(1) An ultrasonic vibration welder including a horn; a vibration transmission rod having an end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn, the vibration transmission rod having a projection that extends perpendicularly to an axis of the vibration transmission rod at a nodal point thereof, the vibration transmission rod having a resonant frequency in an axial direction of the horn and a resonant frequency in a direction intersecting the axis of the horn, the resonant frequencies being different from each other by at least 500 Hz; and a mass formed separately from the vibration transmission rod, the mass having a recess in an end surface thereof for receiving the other end of the vibration transmission rod, the end surface of the mass being configured to contact the projection of the vibration transmission rod while the recess receives the end of the vibration transmission rod, the mass pressing the nodal point of the vibration transmission rod.

(2) An ultrasonic vibration welder including a horn; a vibration transmission rod having an end, a surface of which serves as a vibration-and-pressure application surface, the vibration transmission rod having a polygonal cross section, the vibration transmission rod disposed at an end of the horn in such a manner that the vibration transmission rod extends perpendicularly to an axis of the horn, the vibration transmission rod having a notch that extends perpendicularly to an axis of the vibration transmission rod at a nodal point thereof and a component formed separately from the vibration transmission rod, the component being fitted into the notch; and a mass formed separately from the vibration transmission rod, the mass having a recess in an end surface thereof for receiving the other end of the vibration transmission rod, the end surface of the mass being configured to contact the component fitted into the notch in the vibration transmission rod while the recess receives the other end of the vibration transmission rod, the mass pressing the nodal point of the vibration transmission rod.

(3) An ultrasonic vibration welder including a horn; a vibration transmission rod having an end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn, the vibration transmission rod having a notch that extends perpendicularly to an axis of the vibration transmission rod at a nodal point thereof; and a mass formed separately from the vibration transmission rod, the mass having a recess in an end surface thereof for receiving the other end of the vibration transmission rod and having an inwardly extending projection at the end thereof, the inwardly extending projection being fitted into the notch in the vibration transmission rod and contacting an inner surface of the notch while the recess receives the other end of the vibration transmission rod, the mass pressing the nodal point of the vibration transmission rod.

(4) An ultrasonic vibration welder including a horn; a vibration transmission rod having an end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn; and a mass formed separately from the vibration transmission rod, the mass in contact with the vibration transmission rod pressing a nodal point of the vibration transmission rod, a resonant frequency of the mass in an axial direction thereof being set within ±25% of a resonant frequency of the vibration transmission rod.

First Embodiment

Embodiments of the present invention will now be described.

Figure 1:
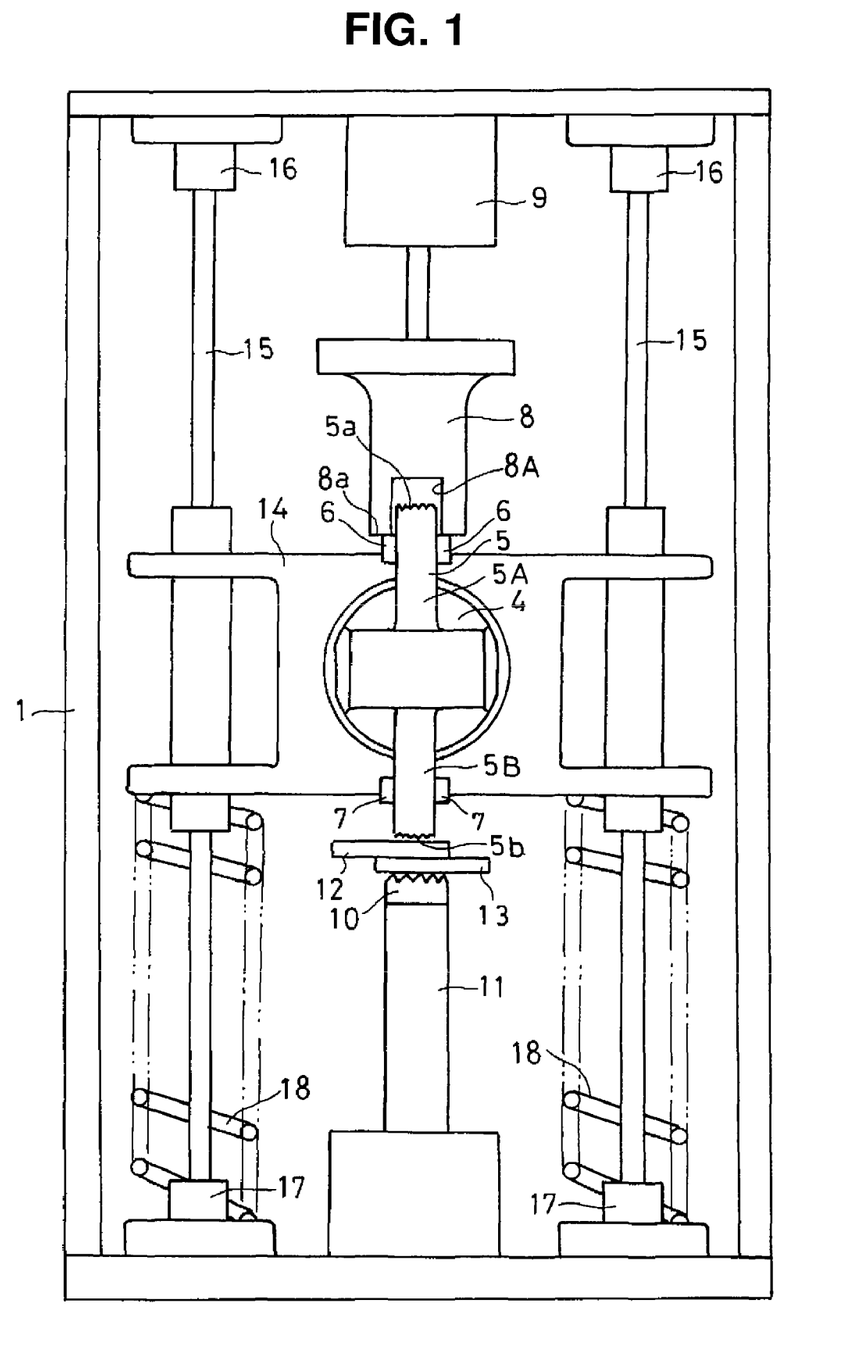
FIG. 1 is a front view of a relevant part of an ultrasonic vibration welder according to a first embodiment of the present invention.
Figure 2:
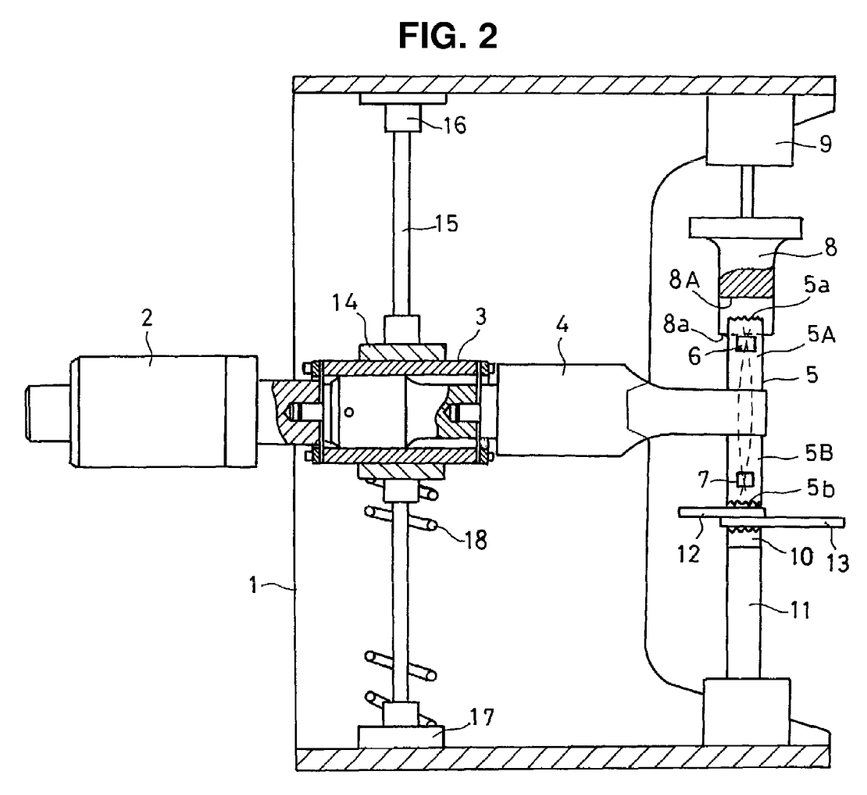
FIG. 2 is a side view of the ultrasonic vibration welder according to the first embodiment, a part of which is shown in cross section.
Figure 3:
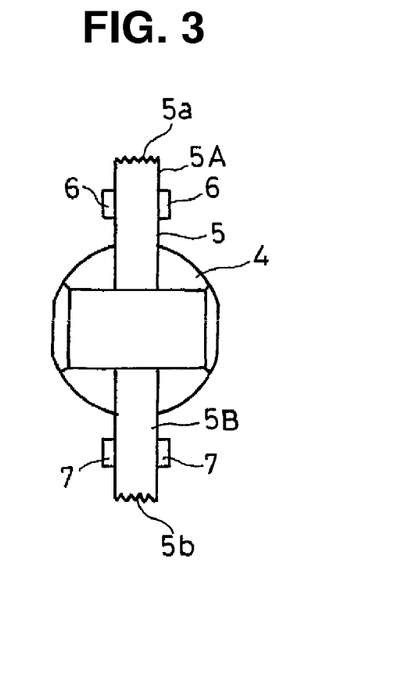
FIG. 3 is a front view of a horn and a vibration transmission rod.
Figure 4:
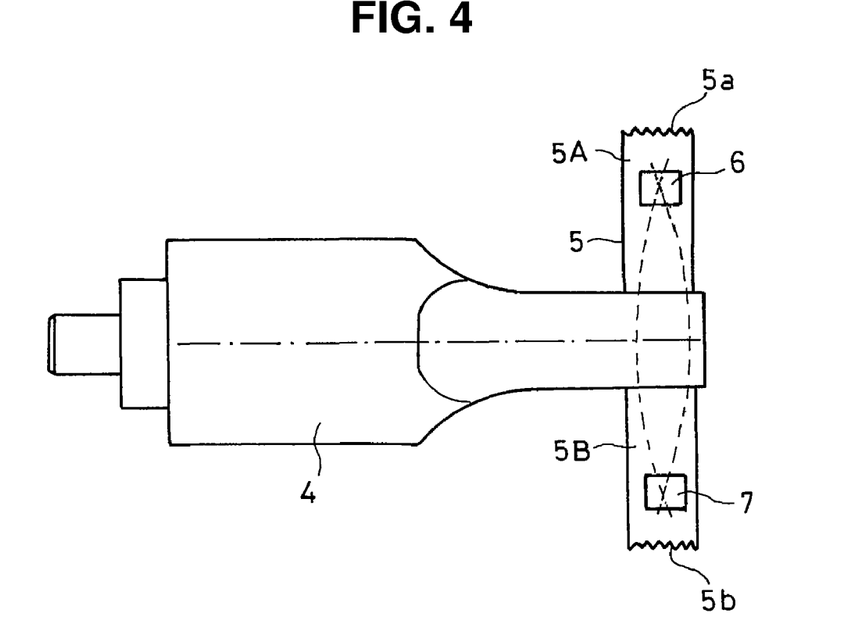
FIG. 4 is a side view of the horn and the vibration transmission rod.

FIG. 1 is a front view of a relevant part of an ultrasonic vibration welder according to a first embodiment of the present invention, and FIG. 2 is a side view of the same, a part of which is shown in cross section. FIG. 3 is a front view of a horn and a vibration transmission rod, and FIG. 4 is a side view of the same.

The ultrasonic vibration welder includes a frame 1 for supporting the following components, an oscillator 2, a polar-mount booster 3, and a horn 4. The polar-mount booster 3 is disposed between the oscillator 2 and the horn 4. The horn 4 is thinned at an end.

A vibration transmission rod 5 is provided at the thinned end of the horn 4 in such a manner that they vibrate together. In the present embodiment, two rods 5A and 5B that extend perpendicularly to the axis of the horn 4 are provided at the thinned end of the horn 4. The two rods 5A and 5B as a pair constitute the vibration transmission rod 5. The vibration transmission rod 5 has a polygonal cross section. One of the end surfaces 5a and 5b serves as a vibration-and-pressure application surface. Further, the vibration transmission rod 5 has projections 6 and 7 that extend perpendicularly to the axis thereof, at nodal points. As described above, the vibration transmission rod 5 has a polygonal cross section. The vibration transmission rod 5 has a resonant frequency in the axial direction of the horn 4 and a resonant frequency in another direction that are different from each other by at least 500 Hz. When subjected to vibration in the same direction as the vibration direction of the horn 4, the vibration transmission rod 5 constitutes, with the horn 4, a resonator that vibrates at a desired frequency.

A mass 8 for applying pressure is formed separately from the vibration transmission rod 5. The mass 8 is configured to contact the vibration transmission rod 5 and press one of the nodal points of the vibration transmission rod 5. In the present embodiment, the mass 8 has a recess 8A formed in an end surface 8a thereof, for receiving the other of the end surfaces 5a and 5b of the vibration transmission rod 5. The end surface 8a of the mass 8 is configured to contact one of the projections 6 and 7 formed on the vibration transmission rod 5, while the recess 8A receives the end of the vibration transmission rod 5. Thus, the mass 8 presses one of the nodal points of the vibration transmission rod 5.

Figure 5:
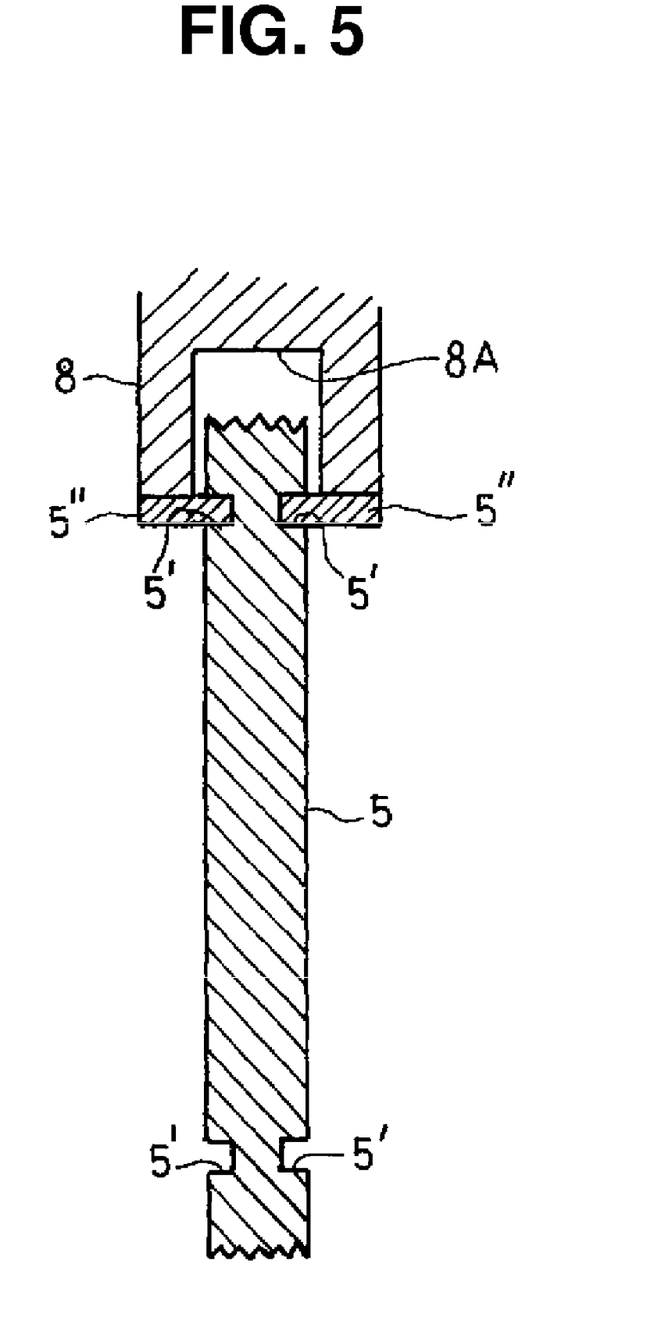
FIG. 5 shows another structure in which a mass presses a nodal point of the vibration transmission rod.

Another structure is shown in FIG. 5. The vibration transmission rod 5 has notches 5' and 5' that extend perpendicularly to the axis of the vibration transmission rod 5, at one of the nodal points thereof. The mass 8 has a recess 8A formed in an end surface 8a thereof, for receiving an end of the vibration transmission rod 5. Components 5" and 5" that are formed separately from the vibration transmission rod 5 are fitted into the notches 5' and 5' provided in the vibration transmission rod 5. The end surface 8a of the mass 8 is configured to contact the components 5" and 5", while the recess 8A receives the end of the vibration transmission rod 5. Thus, the mass 8 presses one of the nodal points of the vibration transmission rod 5.

Figure 6:
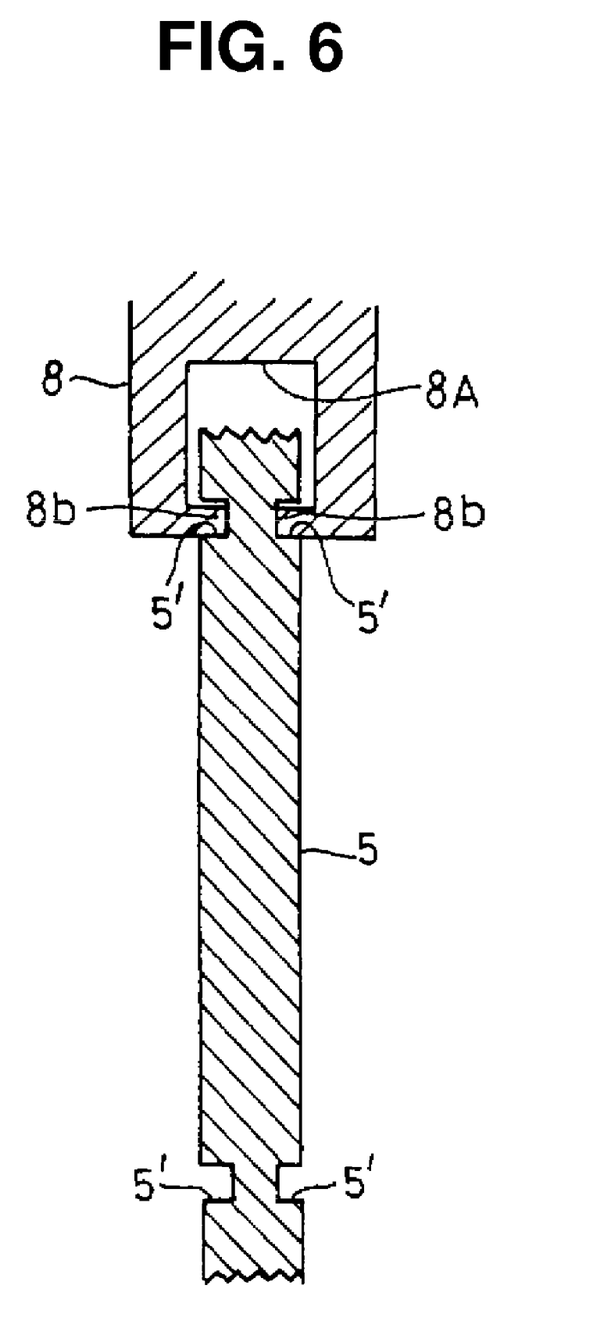
FIG. 6 shows another structure in which a mass presses a nodal point of the vibration transmission rod.

Another structure is shown in FIG. 6. The vibration transmission rod 5 has notches 5' and 5' that extend perpendicularly to the axis of the vibration transmission rod 5, at one of the nodal points thereof. The mass 8 has a recess 8A formed in an end surface thereof, for receiving an end of the vibration transmission rod 5. The mass 8 further has inwardly extending projections 8b and 8b at one end, which will be fitted into the notches 5' and 5' provided in the vibration transmission rod 5. The inwardly extending projections 8b and 8b formed at the end of the mass 8 are fitted into the notches 5' and 5' provided in the vibration transmission rod 5 and contact the inner surfaces of the notches 5' and 5', while the recess 8A receives the end of the vibration transmission rod 5. Thus, the mass 8 presses one of the nodal points of the vibration transmission rod 5.

A pressure applicator 9, such as a cylinder, is connected to the mass 8. An anvil 10 is arranged at a position facing the vibration transmission rod 5, and an anvil base 11 supports the anvil 10. Parts to be welded together are denoted by reference numerals 12 and 13. The ultrasonic vibration welder further includes a vibrating portion holding frame 14, guide posts 15 and 15 for supporting the vibrating portion holding frame 14 in a slidable manner, supporting portions 16 and 17 for supporting the guide posts 15 and 15, and expanding-pressure coil springs 18 and 18 attached to the guide posts 15 and 15, for restoring the vibrating portion holding frame 14 to its original position.

Advantages of the above-described embodiment will now be described.

The horn 4 causes the vibration transmission rod 5 to perform flexural vibration, while the pressure applicator 9 applies welding pressure to one of the nodal points of the vibration transmission rod 5 through the mass 8. The vibration of the vibration transmission rod 5 causes friction between the parts 12 and 13. The friction generates frictional heat, which diffuses or melt-bonds portions of the parts 12 and 13 subjected to friction. Thus, the parts 12 and 13 are welded together.

In the present embodiment, the vibration transmission rod 5 has a polygonal cross section, and has a resonant frequency in the axial direction of the horn 4 and a resonant frequency in another direction that are different from each other by at least 500 Hz. When subjected to vibration in the same direction as the vibration direction of the horn 4, the vibration transmission rod 5, constitutes with the horn 4, a resonator that vibrates at a desired frequency. Thus, the vibration transmission rod 5 vibrates only in the axial direction of the horn 4 during welding, thereby completely solving the problem that the connecting portion between the horn and the vibration transmission rod has a tendency to get damaged.

Further, unlike the known ultrasonic vibration welder, the vibration transmission rod 5 does not use a chip attached to an end thereof, but uses one of the end surfaces 5a and 5b thereof as the vibration-and-pressure application surface. Accordingly, the problems associated with the structure in which a chip is attached to an end of the vibration transmission rod, which is employed in the known ultrasonic vibration welder, are completely solved. Further, both the end surfaces 5a and 5b can be used as the vibration-and-pressure application surface by turning the vibration transmission rod 5 upside down.

In addition, the vibration transmission rod 5 and the mass 8 are formed separately. This solves the problems associated with the structure in which the vibration transmission rod and the mass are formed integrally, which is employed in the known ultrasonic vibration welder. Further, because the mass 8 in contact with the vibration transmission rod 5 presses one of the nodal points of the vibration transmission rod 5, pressure can be applied without affecting the vibration of the vibration transmission rod 5. Further, this configuration minimizes generation of frictional heat due to friction between the mass 8 and the projections 6 and 7 of the vibration transmission rod 5 during application of pressure.

Second Embodiment

Figure 7:
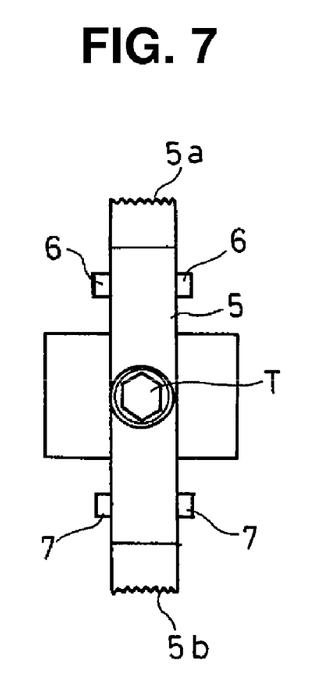
FIG. 7 is a front view of a horn and a vibration transmission rod of an ultrasonic vibration welder according to a second embodiment of the present invention.
Figure 8:
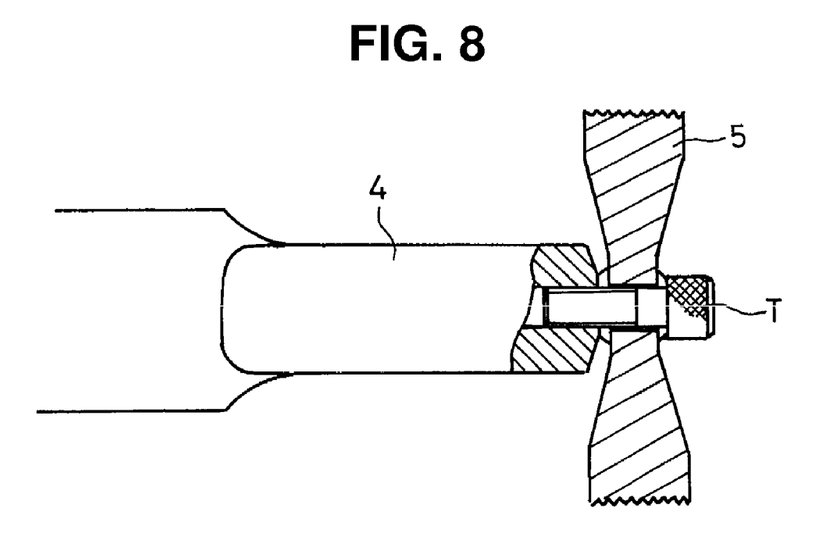
FIG. 8 is a side view of the horn and the vibration transmission rod of the ultrasonic vibration welder according to the second embodiment, a part of which is shown in cross section.

Referring to FIGS. 7 and 8, a second embodiment of the present invention will be described.

The present embodiment is different from the first embodiment in that, in the present embodiment, the horn 4 and the vibration transmission rod 5 are formed separately and connected together by a screw T. Because other structures and advantages are the same as those according to the first embodiment, like components are denoted by like reference numerals, and detailed description thereof will be omitted.

Third Embodiment

Figure 9:
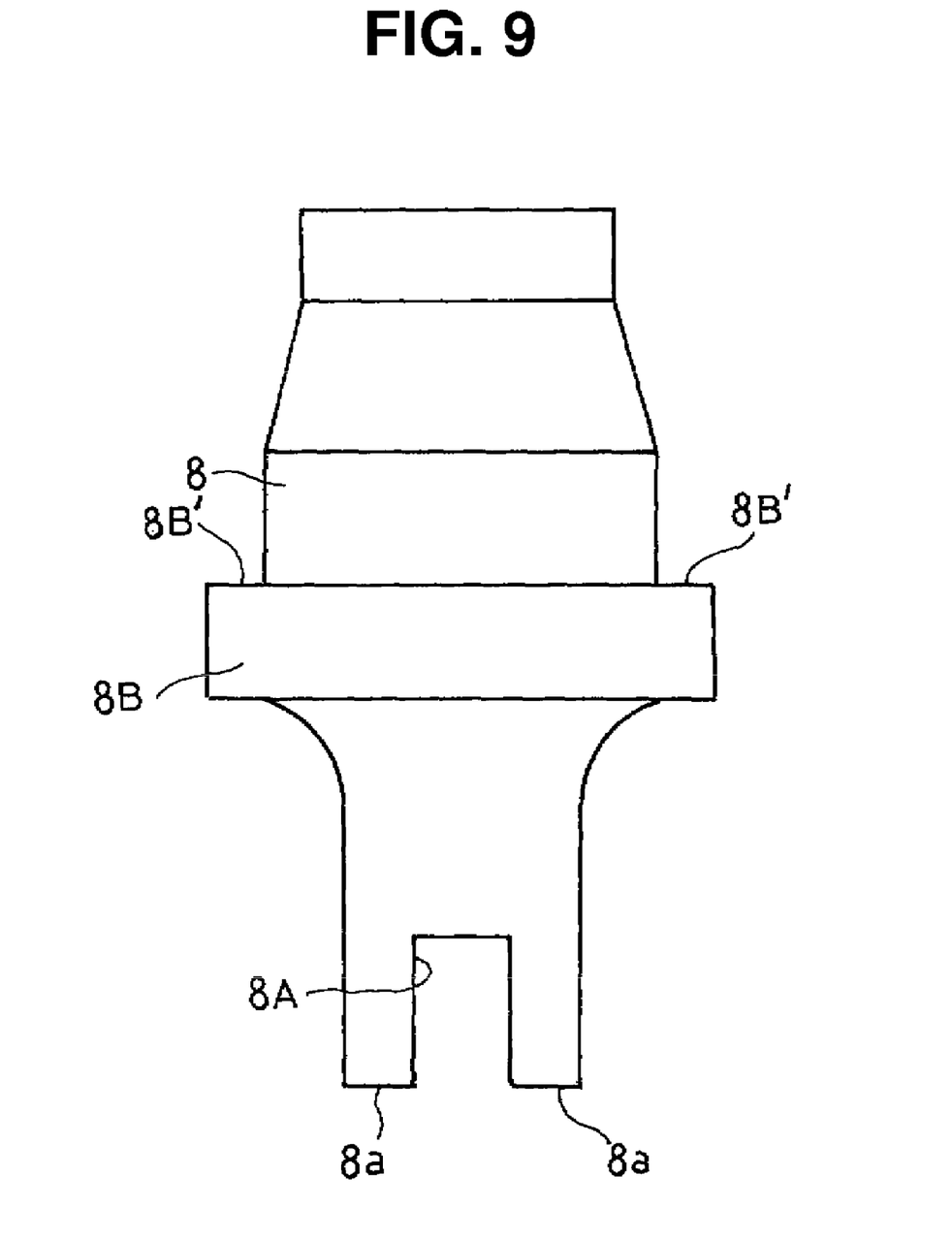
FIG. 9 is a front view of a mass of an ultrasonic vibration welder according to a third embodiment of the present invention.

Referring to FIG. 9, a third embodiment of the present invention will be described.

The present embodiment is different from the first embodiment in that, in the present embodiment, the mass 8 for applying pressure serves as a resonator that vibrates in the axial direction. The mass 8 has a flange 8B for applying pressure at a nodal point located at substantially the middle portion in the axial direction thereof. A pressure-applying mechanism (not shown) applies pressure to top surfaces 8B' and 8B' of the flange 8B for applying pressure. The resonant frequency of the mass 8 in the axial direction is set within ±25% of the resonant frequency of the vibration transmission rod 5. Because other structures and advantages are the same as those according to the first embodiment, like components are denoted by like reference numerals, and detailed description thereof will be omitted.

What is claimed is:

1. An ultrasonic vibration welder comprising:
    a horn;
    a vibration transmission rod having a first end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn, the vibration transmission rod having a projection that extends perpendicularly to an axis of the vibration transmission rod at a nodal point thereof, the vibration transmission rod having a resonant frequency in an axial direction of the horn and a resonant frequency in a direction intersecting the axis of the horn, the resonant frequencies being different from each other by at least 500 Hz; and
    a mass formed separately from the vibration transmission rod, the mass having a recess in an end surface thereof for receiving a second end of the vibration transmission rod, the end surface of the mass being configured to contact the projection of the vibration transmission rod while the recess receives the second end of the vibration transmission rod, the mass pressing the nodal point of the vibration transmission rod.

2. The ultrasonic vibration welder according to claim 1, wherein a surface of the second end of the vibration transmission rod serves as the vibration-and-pressure application surface when the vibration transmission rod is turned upside down.

3. The ultrasonic vibration welder according to claim 1, wherein the vibration transmission rod is fixed to the end of the horn with a screw.

4. The ultrasonic vibration welder according to claim 1,
wherein a resonant frequency of the mass in an axial direction thereof is set within ±25% of a resonant frequency of the vibration transmission rod.

5. An ultrasonic vibration welder comprising:
a horn;
a vibration transmission rod having a first end, a surface of which serves as a vibration-and-pressure application surface, the vibration transmission rod having a polygonal cross section, the vibration transmission rod disposed at an end of the horn in such a manner that the vibration transmission rod extends perpendicularly to an axis of the horn, the vibration transmission rod having a notch that extends perpendicularly to an axis of the vibration transmission rod at a nodal point thereof and a component formed separately from the vibration transmission rod, the component being fitted into the notch; and
a mass formed separately from the vibration transmission rod, the mass having a recess in an end surface thereof for receiving a second end of the vibration transmission rod, the end surface of the mass being configured to contact the component fitted into the notch in the vibration transmission rod while the recess receives the second end of the vibration transmission rod, the mass pressing the nodal point of the vibration transmission rod.

6. The ultrasonic vibration welder according to claim 5,
wherein a surface of the second end of the vibration transmission rod serves as the vibration-and-pressure application surface when the vibration transmission rod is turned upside down.

7. The ultrasonic vibration welder according to claim 6,
wherein the vibration transmission rod is fixed to the end of the horn with a screw.

8. The ultrasonic vibration welder according to claim 5,
wherein a resonant frequency of the mass in an axial direction thereof is set within ±25% of a resonant frequency of the vibration transmission rod.

9. An ultrasonic vibration welder comprising:
a horn;
a vibration transmission rod having a first end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn, the vibration transmission rod having a notch that extends perpendicularly to an axis of the vibration transmission rod at a nodal point thereof; and
a mass formed separately from the vibration transmission rod, the mass having a recess in an end surface thereof for receiving a second end of the vibration transmission rod and having an inwardly extending projection at the end thereof, the inwardly extending projection being fitted into the notch in the vibration transmission rod and contacting an inner surface of the notch while the recess receives the second of the vibration transmission rod, the mass pressing the nodal point of the vibration transmission rod.

10. The ultrasonic vibration welder according to claim 9,
wherein a surface of the second end of the vibration transmission rod serves as the vibration-and-pressure application surface when the vibration transmission rod is turned upside down.

11. The ultrasonic vibration welder according to claim 9,
wherein the vibration transmission rod is fixed to the end of the horn with a screw.

12. The ultrasonic vibration welder according to claim 9,
wherein a resonant frequency of the mass in an axial direction thereof is set within ±25% of a resonant frequency of the vibration transmission rod.

13. An ultrasonic vibration welder comprising:
a horn;
a vibration transmission rod having a first end, a surface of which serves as a vibration-and-pressure application surface, the vibration transmission rod having a polygonal cross section, the vibration transmission rod being disposed at an end of the horn in such a manner that the vibration transmission rod extends perpendicularly to an axis of the horn; and
a mass formed separately from the vibration transmission rod, the mass in contact with the vibration transmission rod pressing a nodal point of the vibration transmission rod, a resonant frequency of the mass in an axial direction thereof being set within ±25% of a resonant frequency of the vibration transmission rod.

14. The ultrasonic vibration welder according to claim 13,
further comprising a pressure-applying mechanism,
wherein the mass has a flange for applying pressure at a nodal point located at substantially the middle portion in the axial direction thereof, and
wherein the pressure-applying mechanism applies pressure to a top surface of the flange.

15. The ultrasonic vibration welder according to claim 13,
wherein a surface of a second end of the vibration transmission rod serves as the vibration-and-pressure application surface when the vibration transmission rod is turned upside down.

16. The ultrasonic vibration welder according to claim 13,
wherein the vibration transmission rod is fixed to the end of the horn with a screw.

* * * * *